United States Patent
Tsuchimoto et al.

(10) Patent No.: US 6,833,090 B2
(45) Date of Patent: Dec. 21, 2004

(54) PROCESS FOR MAKING A POLARIZING FILM

(75) Inventors: Kazuki Tsuchimoto, Ibaraki (JP); Seiji Kondou, Ibaraki (JP); Akihiro Nishida, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 327 days.

(21) Appl. No.: 10/126,954

(22) Filed: Apr. 22, 2002

(65) Prior Publication Data

US 2003/0197939 A1 Oct. 23, 2003

(51) Int. Cl.⁷ .............................. B29D 11/00; G02B 5/30
(52) U.S. Cl. ...................... 264/1.34; 264/1.35; 264/1.6; 264/2.7; 264/78; 264/289.3; 264/289.6; 264/342 RE
(58) Field of Search ................................ 264/1.34, 1.35, 264/1.6, 2.7, 78, 210.3, 210.4, 210.7, 289.3, 289.6, 342 RE

(56) References Cited

U.S. PATENT DOCUMENTS 4,591,512 A * 5/1986 Racich et al. ............ 427/163.1

FOREIGN PATENT DOCUMENTS

| JP | 57-212025 A | 12/1982 |
|---|---|---|
| JP | 63-261201 A | 10/1988 |
| JP | 8-240715 A | 9/1996 |
| JP | 10-288709 A | 10/1998 |
| JP | 11-49878 A | 2/1999 |

* cited by examiner

Primary Examiner—Leo B. Tentoni
(74) Attorney, Agent, or Firm—Westerman, Hattori, Daniels & Adrian LLP

(57) ABSTRACT

The present invention provides a polarizing film having a high polarization degree and high transmittance, a process for producing the polarizing film, and a polarizing plate using the polarizing film, and an optical member. In the process for producing the polarizing film, a polyvinyl alcohol-based film is dry-stretched uniaxially, relaxed in an aqueous solution containing iodine or a dichroic dyestuff, and further stretched in an aqueous solution containing a PVA crosslinking agent. It is preferable that the polyvinyl alcohol-based film has a dry-stretch ratio of at least 2, the film after relaxation has a stretch ratio of at least 1.02, and the total stretch ratio is at most 6.5. It is also preferable that the relaxation rate is at most 10% of the dry-stretch ratio.

12 Claims, No Drawings

PROCESS FOR MAKING A POLARIZING FILM

FIELD OF THE INVENTION

The present invention relates to an optical compensating film that drastically improves contrast, display colors and other visual properties of a liquid crystal display (hereinafter this term can be abbreviated as LCD) and also having higher durability and excellent handling properties in a liquid crystal display, an elliptically polarizing plate, and a liquid crystal display using the optical compensating film and the elliptically polarizing plate.

BACKGROUND OF THE INVENTION

Liquid crystal displays have been used for desk-top electronic calculators, electronic clocks, personal computers, word processors, and meters of automobiles and other machines, and such LCDs comprise polarizing plates. A polarizing plate is produced, for example, by laminating protective films such as triacetylcellulose on both surfaces of a polarizing film of a polyvinyl alcohol-based (PVA) film in which iodine or a dichroic dyestuff is adsorb-oriented. Recently, such films have been required to have a high polarization degree and high transmittance.

A polarizing film can be produced, for example, by adsorbing either iodine or a dichroic dyestuff in a non-oriented polyvinyl alcohol-based film before stretching, or by adsorbing iodine or a dichroic dyestuff in a polyvinyl alcohol-based film that has been stretched and oriented. A polyvinyl alcohol-based film lacks a process stability, and thus it is difficult to stretch uniformly because hydrogen bonds among the molecules are disconnected by moisture during a wet stretch. For producing a film having a high polarization degree and high transmittance, various processes have been proposed. For example, JP-08 (1996)-240715 A describes a process of adsorb-orienting iodine or the like in a polyvinyl alcohol-based film subsequent to a dry uniaxial stretching of the film, and then dipping the film in an aqueous solution containing boric acid at a temperature ranging from 70° C. to 85° C. JP-10 (1998)-288709 A describes a process of dry uniaxial stretching of a polyvinyl alcohol-based film, dyeing, and further stretching of the film at least 1.5 times in a boron compound. JP-11 (1999)-49878 A describes a process of dry uniaxial stretching of a polyvinyl alcohol-based film, dyeing, and stretching of the film from 1.1 to 1.8 times while dipping in an aqueous solution of boric acid.

However, it is difficult to obtain a film having a high polarization degree in the process described in JP-8-240715 A. In the processes as described in JP-A-10-288709 and JP-11-49878 A, the film becomes susceptible to rupture when the stretch ratio in a processing bath including a boron compound is increased for improving the polarization characteristics. Therefore, a method of obtaining stably a film with a high polarization degree has been desired.

SUMMARY OF THE INVENTION

As a result of keen studies, the inventors found that a polarizing film having a high polarization degree and high transmittance is obtainable by uniaxially dry-stretching a polyvinyl alcohol-based film, relaxing the film in an aqueous solution containing either iodine or a dichroic dyestuff, and further stretching the film in an aqueous solution containing a PVA crosslnking agent. An object of the present invention is to provide a polarizing film having a high polarization degree and high transmittance, and a polarizing plate, a polarizing element or a liquid crystal display using the polarizing film.

For achieving the above-described object, a process for producing a polarizing film according to the present invention comprises: uniaxially dry-stretching a polyvinyl alcohol-based film, relaxing the film in an aqueous solution containing iodine or a dichroic dyestuff, and stretching further the relaxed film in an aqueous solution containing a PVA crosslinking agent.

The PVA crosslinking agent is preferably at least one compound selected from the group consisting of boric acid, borax, glyoxal, and glutaraldehyde.

It is preferable in the process that the polyvinyl alcohol-based film has a dry-stretch ratio of at least 2, and the relaxed film has a stretch ratio of at least 1.02. It is also preferable that a relaxation rate of the polyvinyl alcohol-based film is at most 10% of the dry-stretch ratio. Further it is preferable that the polyvinyl alcohol-based film has a total stretch ratio of at most 6.5.

It is preferable in the process that the dry-stretch ratio of the polyvinyl alcohol-based film is from 2 to 6. It is further preferable that the stretch ratio of a relaxed film is from 1.1 to 4.0. It is also preferable that the total stretch ratio of the polyvinyl alcohol-based film is from 4.0 to 6.5.

In the process of the present invention, polyvinyl alcohol-based films having a thickness from 5 $\mu$m to 150 $\mu$m are preferably used.

It is preferable in the process that the iodine-containing aqueous solution contains iodine in a range from 0.01 to 0.5 weight parts and potassium iodide in a range from 0.05 to 50 weight parts for 100 weight parts of water at a temperature from 10° C. to 80° C. The aqueous solution containing a PVA crosslinking agent contains a PVA crosslinking agent in a range from 0.1 to 15 weight parts for 100 weight parts of water at a temperature from 10° C. to 90° C. For the PVA crosslinking agent, a boron compound is used preferably.

In the process, a film stretched in an aqueous solution containing a PVA crosslinking agent can be washed with water and then dried.

A polarizing film according to the present invention can be obtained by uniaxially dry-stretching a polyvinyl alcohol-based film and relaxing it in an aqueous solution containing either iodine or a dichroic dyestuff, and further stretching the film in an aqueous solution containing a PVA crosslinking agent, and the film has a transmittance of at least 43.0% and a polarization degree of at least 98%.

It is preferred that the polyvinyl alcohol-based film has a dry-stretch ratio in a range from 2 to 6, a relaxing rate of at most 10% of the dry-stretch ratio, the relaxed film has a stretch ratio ranging from 1.1 to 4.0 and the polyvinyl alcohol-based film has a total stretch ratio of at most 6.5.

A polarizing plate of the present invention is formed by bonding a protective film on at least one surface of a polarizing film produced in the above-described process according to the present invention.

An optical member of the present invention is formed by laminating either a reflecter or a transflecter on a polarizing film produced in the above-described process according to the present invention.

An optical member of the present invention is formed by laminating a retardation plate or a $\lambda$ plate on a polarizing film produced in the above-described process according to the present invention.

An optical member of the present invention is formed by laminating an optical compensating film on a polarizing film produced in the above-described process according to the present invention.

An optical member of the present invention is formed by laminating a brightness enhancement film on a polarizing film produced in the above-described process according to the present invention.

A liquid crystal display of the present invention comprises a liquid crystal cell and a polarizing film that is produced in a process according to the present invention and applied to at least one surface of the liquid crystal cell.

DETAILED DESCRIPTION OF THE INVENTION

Polyvinyl alcohol-based polymer for forming a polyvinyl alcohol-based film subject to dry uniaxial stretching in the present invention can be prepared by, for example, polymerizing and subsequently saponifying vinyl acetate; or copolymerizing vinyl acetate with a small amount of monomers that can be copolymerized with the vinyl acetate, e.g., unsaturated carboxylic acid, unsaturated sulfonic acid, and cationic monomers. Though polymerization degrees of the polyvinyl alcohol-based polymers can be selected arbitrarily without any specific limitations, a preferred average range of polymerization is from 500 to 10,000, more preferably from 1000 to 6000. A preferred saponification degree is at least 75 mol %, more preferably from 98 mol % to 100 mol %. The film can have a thickness in a range from 5 $\mu$m to 150 $\mu$m, preferably from 10 $\mu$m to 100 $\mu$m.

There is no specific limitation about a dry uniaxial stretching, but it can be selected from, for example, a process of applying backward tension to a film and rolling the film with a roller as described in JP-57 (1982)-212025A; stretching a film by contacting it with a heating roller while applying backward tension as described in JP-63 (1985)-261201 A; stretching while applying tensile force between rollers arranged inside or outside an oven; stretching with a heating roller, e.g., compress-stretching a film by passing it between heating rollers; and stretching by means of a tenter stretcher. It is preferred that the stretch ratio is at least 2, more preferably in a range from 2 to 6, and further preferably from 2 to 5. When the ratio is less than 2, the film will be loose during a relaxation operation in a dyebath, and this makes it difficult for the film to run stably. Preferred temperature range of a heating roller or an oven for stretching is from 50° C. to 200° C., specifically preferably, from 60° C. to 150° C.

In the present invention, a polyvinyl alcohol-based film is relaxed in an aqueous solution (a dyebath) containing either iodine or a dichroic dyestuff after dry-stretching the film uniaxially. That is, a uniaxially-stretched polyvinyl alcohol-based film is dyed in a dyebath while being shrunk to a predetermined stretch ratio. The relaxation rate is preferably 10% or less of the dry-stretch ratio, and particularly preferably from 2 to 10% thereof. That is, when the dry-stretch ratio is expressed as 'A', the relaxation rate is preferably (A×0.1×100)% or less. Dyeing in a relaxed state can improve adsorption-orientation of the dyestuff, and increase the stretch ratio in the processing bath containing a boron compound, thereby providing a film having a high polarization ratio stably. When the relaxation rate exceeds 10%, the film will be loose and deteriorate in the running performance, and variation in the characteristics will be increased.

An iodine-containing aqueous solution contains iodine in a range from 0.01 weight parts to 0.5 weight parts and potassium iodide in a range from 0.05 weight parts to 50 weight parts for 100 weight parts of water. A temperature range of the aqueous solution is in general from 10° C. to 50° C. An aqueous solution containing a dichroic dyestuff contains a dichroic dyestuff in a range from 0.001 weight parts to 1 weight part for 100 weight parts of water. A temperature range of the aqueous solution is in general from 10° C. to 80° C. Dipping time is from 1 second to 10 minutes in general, and preferably from 5 seconds to 5 minutes though there is no specific limitation. A small amount of an organic solvent compatible with water can be contained as well. A polyvinyl alcohol-based film that has been uniaxially stretched can be dipped in water before dyeing in an aqueous solution containing iodine or a dichroic dyestuff.

A polyvinyl alcohol-based film can be relaxed, for example, while dipping the film in an aqueous solution (dyebath) containing iodine or a dichroic dyestuff after stretching the film. Alternatively, a stretched polyvinyl alcohol-based film can be relaxed while an aqueous solution containing iodine or a dichroic dyestuff is coated or sprayed thereon. Techniques for relaxation are not specifically limited, but other processes can be used, for example, appropriately relaxing tension that is applied to a film, relaxation at a fixed ratio, and performing a plurality of these steps. The relaxation rate is adjusted depending on various factors such as temperature and/or concentration of an aqueous solution containing iodine or a dichroic dyestuff, an average polymerization degree and kinds of the polyvinyl alcohol-based film.

Next, the relaxed polyvinyl alcohol-based film is stretched in an aqueous solution containing a PVA crosslinking agent. Preferable stretch ratio is at least 1.02, more preferably from 1.1 to 4.0, and further preferably from 1.2 to 3.5. When the stretch ratio is less than 1.02, a polarizing plate having a high polarization degree cannot be obtained. The polyvinyl alcohol-based film has a total stretch ratio (a product of a stretch ratio of a dry uniaxially-stretched polyvinyl alcohol-based film and a stretch ratio of the same polyvinyl alcohol-based film in a relaxed state) that is preferably 6.5 or less for obtaining a film having a high polarization degree stably, and specifically preferably, in a range from 4.0 to 6.5. When the dry uniaxial stretch ratio of a polyvinyl alcohol-based film is high, a polarizing plate having a high polarization degree will be difficult to obtain. A high stretch ratio in a bath containing a PVA crosslinking agent may cause rupture of the film. The film can be stretched in the aqueous solution containing a PVA crosslinking agent in two or more steps as long as the total amount of the stretch ratio is 1.02 or more.

The aqueous solution containing a PVA crosslinking agent contains in general a PVA crosslinking agent such as boric acid, borax, glyoxal, and glutaraldehyde either alone or as a mixture thereof in a range from 0.1 to 15 weight parts and potassium iodide in a range from 0 to 15 weight parts for 100 weight parts of water. A temperature range of the aqueous solution is in general from 10° C. to 90° C. Dipping time is from 1 second to 15 minutes in general, and preferably from 5 seconds to 10 minutes though there is no specific limitation. A small amount of an organic solvent compatible with water can be contained as well. Preferable PVA crosslinking agents include boron compounds such as boric acid and borax.

A polyvinyl alcohol-based film can be stretched, for example, while dipping the stretched film in an aqueous solution containing a PVA crosslinking agent. Alternatively, a relaxed polyvinyl alcohol-based film can be stretched while an aqueous solution containing a PVA crosslinking agent is coated or sprayed thereon. Techniques for stretching are not specifically limited, but some other processes can be used, for example, appropriately adjusting tension that is applied to a film, stretching at a fixed ratio, and performing a plurality of these steps. The tension is adjusted corresponding to various factors such as temperature and/or concentration of an aqueous solution containing a PVA crosslinking agent, an average polymerization degree and kinds of the polyvinyl alcohol-based film.

Subsequent to the adsorption-orientation, the polyvinyl alcohol-based film is washed with water and dried to provide a polarizing film. A temperature range for the washing is in general from 5° C. to 60° C., or preferably from 5° C. to 40° C. A time for the washing is in general from 1 second to 10 minutes, or preferably from 1 second to 5 minutes, though it is not specifically limited. A temperature range for the drying is in general from 10° C. to 120° C., or preferably from 20° C. to 90° C. A time for drying is in general from 10 seconds to 20 minutes, or preferably from 1 minute to 10 minutes, though it is not specifically limited. A typical polarizing film according to the present invention has a thickness from 1 $\mu$m to 80 $\mu$m, particularly preferably from 2 $\mu$m to 40 $\mu$m, though it is not specifically limited.

A polarizing plate according to the present invention will be described below. A polarizing plate has a basic structure provided by adhering a transparent protective film as a protective layer on at least one surface of the polarizing film through any suitable adhesive layer, e.g., an adhesive layer comprising vinyl alcohol-based polymer or the like.

Any appropriate transparent film can be used for a protective film material to form a transparent protective layer on at least one surface of the polarizing film. Particularly preferred films comprise polymers with excellent properties such as transparency, mechanical strength, thermal stability and moisture-blocking property. Though the polymers are not specifically limited, examples include acetate-based resins such as triacetylcellulose, polyester-based resins, polyethersulfone-based resins, polycarbonate-based resins, polyamide-based resins, polyimide-based resins, polyolefin-based resins, and acrylic resins.

A transparent protective film preferred especially from the aspect of polarizing characteristics and durability is a tri-acetylcellulose film having a surface saponified with an alkali substance or the like. Though the thickness of the transparent protective film can be determined arbitrarily, it is in general 500 $\mu$m or less, preferably from 5 $\mu$m to 300 $\mu$m, and particularly preferably from 5 $\mu$m to 150 $\mu$m for providing a thin polarizing plate. Transparent protective films formed on both surfaces of a polarizing film are not necessarily made of identical polymers.

A transparent protective film used for the protective layer can be treated to provide properties such as hard coating, antireflection, anti-sticking, diffusion and anti-glaring, as long as the purposes of the present invention are not sacrificed. Hard coating treatment is applied, for example, to prevent scratches on the surfaces of the polarizing plate. A surface of the transparent protective film can be applied with a coating film of a cured resin with excellent hardness and smoothness, e.g., an ultraviolet-cure type resin based on silicone, urethane, acrylic, epoxy or the like.

Antireflection treatment may be applied to prevent reflection of outdoor daylight on the surface of the polarizing plate. Such an anti-reflection film or the like can be formed in a known method. Anti-sticking treatment is applied to prevent adherence of adjacent layers. Anti-glare treatment is applied to prevent visibility of light transmitted through the polarizing plate from being hindered by outdoor daylight reflected on the polarizing plate surface. Anti-glare treatment can be carried out by providing microscopic asperities on a surface of a transparent protective film in an appropriate manner, e.g., by roughening the surface by sand-blasting or embossing, or by blending transparent particles.

The above-mentioned transparent fine particles will be selected from silica, alumina, titania, zirconia, stannic oxide, indium oxide, cadmium oxide, antimony oxide or the like, and the particles have an average diameter ranging from 0.5 $\mu$m to 20 $\mu$m. Inorganic fine particles having electroconductivity can be used as well. Alternatively, the particles can be organic fine particles comprising, for example, crosslinked or uncrosslinked polymer particles. An amount of the transparent fine particles ranges from 2 weight parts to 70 weight parts, and generally, from 5 weight parts to 50 weight parts, for 100 weight parts of a transparent resin.

An anti-glare layer comprising transparent fine particles can be provided as the transparent protective layer or a coating layer applied onto a transparent protective layer surface. The anti-glare layer can function as a diffusion layer to diffuse light transmitted through the polarizing plate in order to enlarge visual angles (this function is denoted as visual angle compensation). The above-mentioned layers such as the antireflection layer, the anti-sticking layer, the diffusion layer and the anti-glare layer can be provided as an sheet of optical layers comprising these layers separately from the transparent protective layer.

There is no specific limitation on a method to adhere the polarizing film and the transparent protective film. Adhesion can be applied, for example, by using adhesives such as an adhesive comprising vinyl alcohol-based polymer, or an adhesive comprising at least the vinyl alcohol-based polymer and a water-soluble agent to crosslink the vinyl alcohol-based polymer, such as boric acid, borax, glutaraldehyde, melamine and oxalic acid. Thereby, the transparent protective film is resistant to peeling that occurs under influences of moisture or heat, thus providing excellent light transmittance and polarization degree. Such an adhesive layer is formed by, for example, applying and drying an aqueous solution, and an additive or a catalyst such as an acid can be blended in preparation of the aqueous solution if required.

A polarizing plate of the present invention can be laminated with another optical layer in order to be used as an optical member. Though there is no specific limitation on the optical layer, one or more suitable optical layer applicable for formation of a liquid crystal display can be used, and the optical layer can be selected from, for example, a reflecter, a transflecter, a retardation plate such as a $\lambda$ plate like a half wavelength plate and a quarter wavelength plate, an optical compensating film, and a brightness enhancement film. In a preferred embodiment, a reflective polarizing plate or a semitransparent reflective polarizing plate formed by laminating an additional reflector or a transflecter on the above-mentioned polarizing plate comprising a polarizing film and a protective layer according to the present invention; an elliptically polarizing plate or a circularly polarizing plate, formed by laminating an additional retardation plate on the above-mentioned polarizing plate comprising a polarizing film and a protective layer; a polarizing plate having an optical compensating film laminated additionally on the above-mentioned polarizing plate comprising a polarizing film and a protective layer; and a polarizing plate having a brightness enhancement film laminated additionally on the above-mentioned polarizing plate comprising a polarizing film and a protective layer, is used.

A reflector is provided to a polarizing plate in order to form a reflective polarizing plate. In general, such a reflective polarizing plate is arranged on a backside of a liquid crystal cell in order to make a liquid crystal display to reflect incident light from a visible side (display side). The reflective polarizing plate has some merits, for example, assembling of light sources such as backlight can be omitted, and the liquid crystal display can be thinned further.

The reflective polarizing plate can be formed in an appropriate manner such as attaching a reflecting layer of metal or the like on one surface of the polarizing plate. For example, a transparent protective film is prepared by matting one of the surfaces if required. On this surface, a foil comprising a reflective metal such as aluminum or a deposition film is applied to form a reflecting layer.

An additional example of a reflective polarizing plate comprises the above-mentioned transparent protective film having a surface with microscopic asperities due to contained fine particles, and also a reflecting layer corresponding to the microscopic asperities. The reflecting layer having a microscopic asperity surface diffuses incident light irregularly so that directivity and glare can be prevented and irregularity in color tones can be controlled. The reflecting layer having a microscopic asperity surface corresponding to the surface with microscopic asperities of the transparent protective film is transparent protective film can be formed by attaching a metal directly on a surface of a transparent protective film in any appropriate methods including deposition such as vacuum deposition, and plating such as ion plating and sputtering.

Alternatively, the reflecter can be used as a reflecting sheet formed by providing a reflecting layer onto a proper film similar to the transparent protective film. Since a typical reflecting layer of a reflecter is made of a metal, it is preferably used in a state coated with a film, a polarizing plate or the like in order to prevent a reduction of the reflection ratio due to oxidation. As a result, the initial reflection ratio is maintained for a long period, and a separate protective layer can be omitted.

A semitransparent polarizing plate is provided by replacing the reflecting layer in the above-mentioned reflective polarizing plate by a semitransparent reflecting layer, and it is exemplified by a half mirror that reflects and transmits light at the reflecting layer. In general, such a semitransparent polarizing plate is arranged on a backside of a liquid crystal cell. In a liquid crystal display comprising the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

The above-mentioned polarizing plate comprising a polarizing film and a protective layer can have an additional laminate of a retardation plate so as to provide an elliptically polarizing plate or a circularly polarizing plate.

The retardation plate is used for modifying linearly polarized light to either elliptically polarized light or circularly polarized light, modifying either elliptically polarized light or circularly polarized light to linearly polarized light, or modifying a polarization direction of linearly polarized light. For example, a retardation plate called a quarter wavelength plate ($\lambda/4$ plate) is used for modifying linearly polarized light to either elliptically polarized light or circularly polarized light, and for modifying either elliptically polarized light or circularly polarized light to linearly polarized light. A half wavelength plate ($\lambda/2$ plate) is used in general for modifying a polarization direction of linearly polarized light.

The above-described elliptically polarizing plate is effective in compensating colors (blue or yellow) generated due to birefringence in a liquid crystal layer of a super twist nematic (STN) liquid crystal display so as to provide a black-and-white display free of such colors. Controlling three-dimensional refractive index is preferred further since it can compensate (prevent) colors that will be observed when looking a screen of the liquid crystal display from an oblique direction. A circularly polarizing plate is effective in adjusting color tones of an image of a reflective liquid crystal display that has a color image display, and the polarizing plate serves to prevent reflection as well.

Specific examples of the retardation plates include birefringent films, oriented films of liquid crystal polymers, sheets comprising film and oriented layers supported by the films, and incline-oriented films. The birefringent films can be prepared by stretching films of any suitable liquid crystal polymers such as polycarbonate, polyvinyl alcohol, polystyrene, polymethyl methacrylate, polyolefins including polypropylene, polyalylate, and polyamide. An incline-oriented film is produced, for example, by bonding a heat shrinkable film onto a polymer film and stretching and/or shrinking the polymer film under the influence of a shrinking force provided by heat, or by obliquely orienting a liquid crystal polymer.

A polarizing plate described below comprises the above-mentioned polarizing film and protective layer, and further an additional viewing angle compensating film laminated on the polarizing plate.

A viewing angle compensating film is used to widen a visual angle so that an image can be relatively clear when a screen of a liquid crystal display is seen, not in a direction perpendicular to the screen but in a slightly oblique direction.

Such a viewing angle compensating film can be a triacetylcellulose film coated with a discotic liquid crystal, or a retardation plate. While an ordinary retardation plate is a birefringent polymer film that is stretched uniaxially in the plane direction, a retardation plate used for an viewing angle compensating film is a two-way stretched film such as a birefringent polymer film stretched biaxially in the plane direction and an incline-oriented polymer film with controlled birefringence in the thickness direction that is stretched uniaxially in the plane direction and stretched also in the thickness direction. The incline-oriented film is prepared by, for example, bonding a heat shrinkable film to a polymer film and stretching and/or shrinking the polymer film under the influence of a shrinkage force provided by heat, or by obliquely orienting a liquid crystal polymer. A polymer as a material of the retardation plate is similar to the polymer used for the above-mentioned retardation plate.

A polarizing plate described below is produced by additionally laminating a brightness enhancement film on the above-mentioned polarizing plate comprising a polarizing film and a protective layer. Generally, this polarizing plate is arranged on a backside of a liquid crystal cell. When natural light enters, by reflection from a backlight or a backside of a liquid crystal display etc., the brightness enhancement film reflects linearly polarized light of a predetermined polarizing axis or circularly polarized light in a predetermined direction while the same film transmits other light. It allows entrance of light from a light source such as a backlight so as to obtain transmitted light in a predetermined polarization state, while reflecting light other than light in the predetermined polarization state. Light that is reflected at this brightness enhancement film is reversed through a reflecting layer or the like arranged additionally behind the brightness enhancement film. The reversed light that re-enters the brightness enhancement plate is transmitted partly or entirely as light in a predetermined polarization state, so that light transmitting the brightness enhancement film is increased and polarized light that is hardly absorbed in the polarizing film is supplied. As a result, the quantity of light available for the liquid crystal display etc. can be increased to enhance brightness. When light enters through a polarizing film from the backside of a liquid crystal cell by using a backlight or the like without using any brightness enhancement films, most light is absorbed in the polarizing film but not transmitted by the polarizing film if the light has a polarization direction inconsistent with the polarization axis of the polarizing film. Depending on characteristics of the polarizing film, about 50% of light is absorbed in the polarizing film, and this decreases the quantity of light available in the liquid crystal display or the like and makes the image dark. The brightness enhancement film repeatedly prevents light having a polarization direction to be absorbed in the polarizing film from entering the polarizing film, and reflects the light on the brightness enhancement film, reverses the light through a reflecting layer or the like arranged behind, and makes the light re-enter the brightness enhancement plate. Since the polarized light that is reflected and reversed between them is transmitted only if the light has a polarization direction to pass the polarizing film, light from a backlight or the like can be used efficiently for displaying images of a liquid crystal display in order to provide a bright screen.

A suitable example of the brightness enhancement film is selected from a multilayer thin film of a dielectric or a multilayer lamination of thin films with varied refraction aeolotropy (e.g., "D-BEF" supplied by 3M Co.) that transmits linearly polarized light having a predetermined polarization axis while reflecting other light, and a cholesteric liquid crystal layer, more specifically, an oriented film of a cholesteric liquid crystal polymer or an oriented liquid crystal layer fixed onto a supportive substrate (e.g., "PCF 350" supplied by Nitto Denko Corporation; "Transmax" supplied by Merck and Co., Inc.) that reflects either clockwise or counterclockwise circularly polarized light while transmitting other light.

Therefore, for a brightness enhancement film to transmit linearly polarized light having a predetermined polarization axis, the transmission light enters the polarizing plate by matching the polarization axis so that absorption loss due to the polarizing plate is controlled and the light can be transmitted efficiently. For a brightness enhancement film to transmit circularly polarized light, i.e., a cholesteric liquid crystal layer, preferably, the transmitted circularly polarized light is converted to linearly polarized light before entering the polarizing plate with a view at controlling of the absorption loss, though the circularly polarized light can enter the polarizing film directly. Circularly polarized light can be converted to linearly polarized light by using a quarter wavelength plate for a retardation plate.

A retardation plate having a function as a quarter wavelength plate in a wide wave range including a visible light region can be obtained, for example, by overlapping a retardation layer functioning as a quarter wavelength plate for monochromatic light such as light having 550 nm wavelength and another retardation plate showing a separate optical retardation property (e.g., a retardation plate functioning as a half wavelength plate). Therefore, a retardation plate arranged between a polarizing plate and a brightness enhancement film can comprise a single layer or at least two layers of retardation layers.

A cholesteric liquid crystal layer can also be provided by combining layers different in the reflection wavelength and it can be configured by overlapping two or at least three layers. As a result, the obtained retardation plate can reflect circularly polarized light in a wide wavelength range including a visible light region, and this can provide transmission of circularly polarized light in a wide wavelength range.

A polarizing plate according to the present invention can be made by laminating a polarizing plate and two or at least three optical layers, similarly to the above-described polarization-separation type polarizing plates. In other words, the polarizing plate can be a reflective polarizing plate or a semitransparent polarizing plate for elliptically polarized light, which is prepared by combining either the above-mentioned reflective polarizing plate or a semitransparent polarizing plate with a retardation plate. An optical member comprising a lamination of two or at least three optical layers can be formed by a method of laminating layers separately in a certain order for manufacturing a liquid crystal display etc. Since an optical member that has been laminated previously has excellent stability in quality and assembling operability, efficiency in manufacturing a liquid crystal display can be improved. Any appropriate adhesion means such as a pressure-sensitive adhesive can be used for laminating the polarizing plate and optical layers.

A pressure-sensitive adhesive layer can be provided to a polarizing plate or to an optical member in the present invention for adhesion with other members such as a liquid crystal cell. The pressure-sensitive adhesive layer can contain any suitable pressure-sensitive adhesives such as an acrylic adhesive in accordance with conventional techniques. Particularly, pressure-sensitive adhesive layers having a low moisture absorption coefficient and an excellent heat resistance are preferred from the aspect of prevention of foaming or peeling caused by moisture absorption or prevention of decrease in the optical properties and warping of a liquid crystal cell caused by difference in thermal expansion coefficients. As a result, a high quality liquid crystal display having excellent durability can be produced. The pressure-sensitive adhesive layer can include fine particles to obtain optical diffisivity. Pressure-sensitive adhesive layers can be provided to appropriate surfaces if required. For example, a polarizing plate comprising a polarizing film and a protective layer can be provided with a pressure-sensitive adhesive layer on at least one surface of the protective layer.

When a pressure-sensitive adhesive layer is exposed on a surface of the polarizing plate or the optical member, preferably, the pressure-sensitive adhesive layer is covered with a separator by the time the pressure-sensitive adhesive layer is used so that contamination will be prevented. The separator can be made of an appropriate thin sheet by coating a peeling agent if required, and the peeling agent may be selected, for example, from a silicone-based agent, a long-chain alkyl-based agent, a fluorine-based agent, an agent comprising molybdenum sulfide or the like.

The above-described members composing a polarizing plate and an optical member, such as a polarizing film, a transparent protective film, an optical layer and a pressure-sensitive adhesive layer, can have ultraviolet absorption power as a result of treatment with an ultraviolet absorber such as an ester salicylate compound, a benzophenone compound, a benzotriazole compound, a cyanoacrylate compound, and a nickel complex salt compound.

Polarizing plates and optical members according to the present invention can be used for forming various devices such as LCDs. Specifically, such a polarizing plate or an optical member can be arranged preferably on at least one surface of a liquid crystal cell of a reflective/semitransparent liquid crystal display. The liquid crystal display is selected from devices of conventionally known structures, such as transmission type, reflection type, or a transmission-reflection type. A liquid crystal cell to compose the liquid crystal display can be selected from appropriate cells of such as active matrix driving type represented by a thin film transistor, a simple matrix driving type represented by a twist nematic type and a super twist nematic type.

When polarizing plates or optical members are arranged on both surfaces of a liquid crystal cell, the polarizing plates or the optical members on the surfaces can be the same or can be varied. Moreover, for forming a liquid crystal display, one or at least two layers of appropriate members such as a prism array sheet, a lens array sheet, an optical diffuser and a backlight can be arranged at proper positions.

The present invention will be described below more specifically by referring to Examples and Comparative Examples, though the present invention is not limited to the Examples.

EXAMPLE 1

A polyvinyl alcohol (PVA) film having an average polymerization degree of 2400 and a film thickness of 75 µm (a product by Kuraray, trade name: 9X75RS) were stretched 3 times in an oven at 100° C. Later, the film was dipped for one minute in a 30° C. iodine bath (concentration: 0.04 wt %) while being relaxed (relaxation rate is 20%, which corresponds to 6.7% of a dry-stretch ratio). The film was further dipped for one minute in a 30° C. boric acid bath (concentration: 5 wt %) while being stretched 1.5 times, and washed in 25° C. pure water, dried for 4 minutes at 60° C., so that a polarizing film was obtained.

EXAMPLE 2

A PVA film as described in Example 1 was applied with tension backwards while being contacted with a surface of a heating roller at 100° C. so as to stretch 4 times. Later, the film was dipped for one minute in a 30° C. iodine bath (concentration: 0.04 wt %) while being relaxed (relaxation rate is 20%, which corresponds to 5% of a dry stretch ratio). The film was further dipped for one minute in a 30° C. boric acid bath (concentration: 5 wt %) while being stretched 1.3 times, and washed in 25° C. pure water, dried for 4 minutes at 60° C., so that a polarizing film was obtained.

EXAMPLE 3

A PVA film as described in Example 1 was stretched 4 times in an oven at 100° C. Later, the film was dipped for one minute while being relaxed in a 30° C. iodine bath (concentration: 0.04 wt %) (relaxation rate is 25%, which corresponds to 6.3% of a dry-stretch ratio). The film was further dipped for one minute in a 30° C. boric acid bath (concentration: 5 wt %) while being stretched 1.3 times, and washed in 25° C. pure water, dried for 4 minutes at 60° C., so that a polarizing film was obtained.

COMPARATIVE EXAMPLE 1

A PVA film as described in Example 1 was stretched axially 3 times in an oven at 100° C. Later, the film was dipped for one minute in a 30° C. iodine bath while maintaining its stretched state, and further dipped for one minute in a 30° C. boric acid bath (concentration: 5 wt %) while being stretched 1.5 times, and washed in 25° C. pure water, dried for 4 minutes at 60° C., so that a polarizing film was obtained.

COMPARATIVE EXAMPLE 2

A PVA film as described in Example 1 was applied with tension backwards while being contacted with a surface of a heating roller at 100° C. so as to stretch 4 times. Later, the film was dipped for one minute in a 30° C. iodine bath while maintaining its stretched state, and further dipped for one minute in a 30° C. boric acid bath (concentration: 5 wt %) while being stretched 1.3 times, and washed in 25° C. pure water, dried for 4 minutes at 60° C., so that a polarizing film was obtained.

COMPARATIVE EXAMPLE 3

A PVA film as described in Example 1 was stretched 4 times in an oven at 100° C. Later, the film was dipped for one minute in a 30° C. iodine bath while maintaining its stretched state, and further dipped for one minute in a 30° C. boric acid bath (concentration: 5 wt %) while being stretched 1.3 times, and washed in 25° C. pure water, dried for 4 minutes at 60° C., so that a polarizing film was obtained.

(Evaluation)

Polarization films produced in the Examples and Comparative Examples were evaluated for the optical characteristics in the following manner. The results are shown in Table 1.

(Transmittance)

Transmittance denotes a Y value that is measured by means of a spectrophotometer (UV-2400 produced by Shimadsu Corp.), where the visibility is corrected in view of two-degrees-visual field (C light source) according to Japanese Industrial Standard (JIS) Z8701.

(Polarization Degree)

A polarizing degree is obtained by calculating a measurement result of transmittance ($H_0$ and $H_{90}$) in accordance with the method for measuring transmittance, and by using the following equation. $H_0$ denotes a transmittance obtained by laminating two polarizing films so that the polarizing axes become parallel, while $H_{90}$ denotes a transmittance obtained by laminating two polarizing films so that the polarizing axes become perpendicular to each other. The parallel transmittance ($H_0$) and the perpendicular transmittance ($H_{90}$) are Y values corrected in the visibility in view of two-degrees-visual field (C light source) according to Japanese Industrial Standard (JIS) Z8701.

$$\text{Polarization Degree}(\%) = \sqrt{\frac{H_0 - H_{90}}{H_0 + H_{90}}} \times 100$$

TABLE 1

|  | Transmittance | Polarization degree |
| --- | --- | --- |
| Example 1 | 43.5% | 98.5% |
| Example 2 | 43.6% | 98.7% |
| Example 3 | 43.8% | 98.3% |
| Comparative Example 1 | 43.1% | 94.3% |
| Comparative Example 2 | 43.5% | 96.2% |
| Comparative Example 3 | 43.6% | 95.8% |

As indicated in Table 1, Examples in which relaxation is performed during dipping in iodine-containing baths provide higher polarization degrees compared to those of Comparative Examples that do not include relaxation.

As described above, a process for producing a polarizing film according to the present invention comprises steps of uniaxially dry-stretching a polyvinyl alcohol-based film, relaxing the film in an aqueous solution containing iodine or a dichroic dyestuff, and further stretching the film in an aqueous solution containing a boron compound so that the thus obtained polarizing film has high transmittance and a high polarization degree. Since this process including dyeing with relaxation can improve adsorption-orientation of a dyestuff, a film with high transmittance can be obtained easily, and the thus obtained film can have a high polarization degree even when the polyvinyl alcohol-based film has a relatively small stretch ratio in the aqueous solution containing a boron compound. Therefore, a polarizing film with a high polarization degree and high transmittance can be produced constantly.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A process for producing a polarizing film, comprising:
   uniaxially dry-stretching a polyvinyl alcohol-based film,
   relaxing the polyvinyl alcohol-based film in an aqueous solution containing a component selected from the group consisting of iodine and a dichroic dyestuff, and
   stretching further the relaxed polyvinyl alcohol-based film in an aqueous solution containing a PVA crosslinking agent,
   wherein the polyvinyl alcohol-based film has a relaxation rate of 2 to 10% of the dry-stretch ratio.

2. The process according to claim 1, wherein the PVA crosslinking agent is at least one compound selected from the group consisting of boric acid, borax, glyoxal, and glutaraldehyde.

3. The process according to claim 1, wherein the polyvinyl alcohol-based film has a dry-stretch ratio of at least 2 and the film after relaxation has a stretch ratio of at least 1.02.

4. The process according to claim 1, wherein the polyvinyl alcohol-based film has a relaxation rate of at least 5% of the dry-stretch ratio.

5. The process according to claim 1, wherein the polyvinyl alcohol-based film has a total stretch ratio of at most 6.5.

6. The process according to claim 3, wherein the polyvinyl alcohol-based film has a dry-stretch ratio ranging from 2 to 6.

7. The process according to claim 3, wherein the polyvinyl alcohol-based film after relaxation has a stretch ratio ranging from 1.1 to 4.0.

8. The process according to claim 3, wherein the polyvinyl alcohol-based film has a total stretch ratio ranging from 4.0 to 6.5.

9. The process according to claim 1, wherein the polyvinyl alcohol-based film has a thickness ranging from 5 $\mu$m to 150 $\mu$m.

10. The process according to claim 1, wherein the aqueous solution containing iodine contains iodine in a range from 0.01 to 0.5 weight parts and potassium iodide in a range from 0.05 to 50 weight parts for 100 weights parts of water and the temperature range is from 10° C. to 80° C.

11. The process according to claim 1, wherein the aqueous solution containing a PVA crosslinking agent contains a PVA crosslinking agent in a range from 0.1 to 15 weight parts for 100 weight parts of water and the temperature range is from 10° C. to 90° C.

12. The process according to claim 11, wherein the PVA crosslinking agent is a boron compound.

* * * * *